United States Patent

Montgomery

[15] 3,654,903

[45] Apr. 11, 1972

[54] METHOD OF GROWING EARTHWORMS AND PLANTS AND PRODUCING COMPOST

[72] Inventor: Morris M. Montgomery, P. O. Box 536, Cottonwood, Ariz. 86326

[22] Filed: Oct. 30, 1970

[21] Appl. No.: 86,154

[52] U.S. Cl. ..................................119/15, 119/1, 119/16, 47/17
[51] Int. Cl. .......................................A01k 67/00
[58] Field of Search .................119/15, 1, 16; 47/17; 43/55

[56] References Cited

UNITED STATES PATENTS

| 2,527,214 | 10/1950 | Graves | 119/15 |
| 2,642,836 | 6/1953 | Brooks | 119/15 |
| 2,827,138 | 3/1958 | Roy, Jr. | 47/17 X |
| 2,867,055 | 1/1959 | Lebiedzinski | 119/1 X |
| 2,885,819 | 5/1959 | Newell et al. | 43/55 |
| 3,129,692 | 4/1964 | Sanderson | 119/15 |

*Primary Examiner*—Hugh R. Chamblee
*Attorney*—Clarence A. O'Brien and Harvey B. Jacobson

[57] ABSTRACT

A building structure providing a controlled environment for growing earthworms and plants and producing compost by the use of a plurality of leaching and growing columns each having a plurality of stacked containers having a quantity of bedding therein except for the bottom container which receives compost from the stack. All of the containers above the bottom container have drain holes therein whereby leaching liquid may be poured into the uppermost container for leaching compost from the containers for collection in the bottom container. Plants may be grown in the upper container.

10 Claims, 5 Drawing Figures

Morris M. Montgomery
INVENTOR

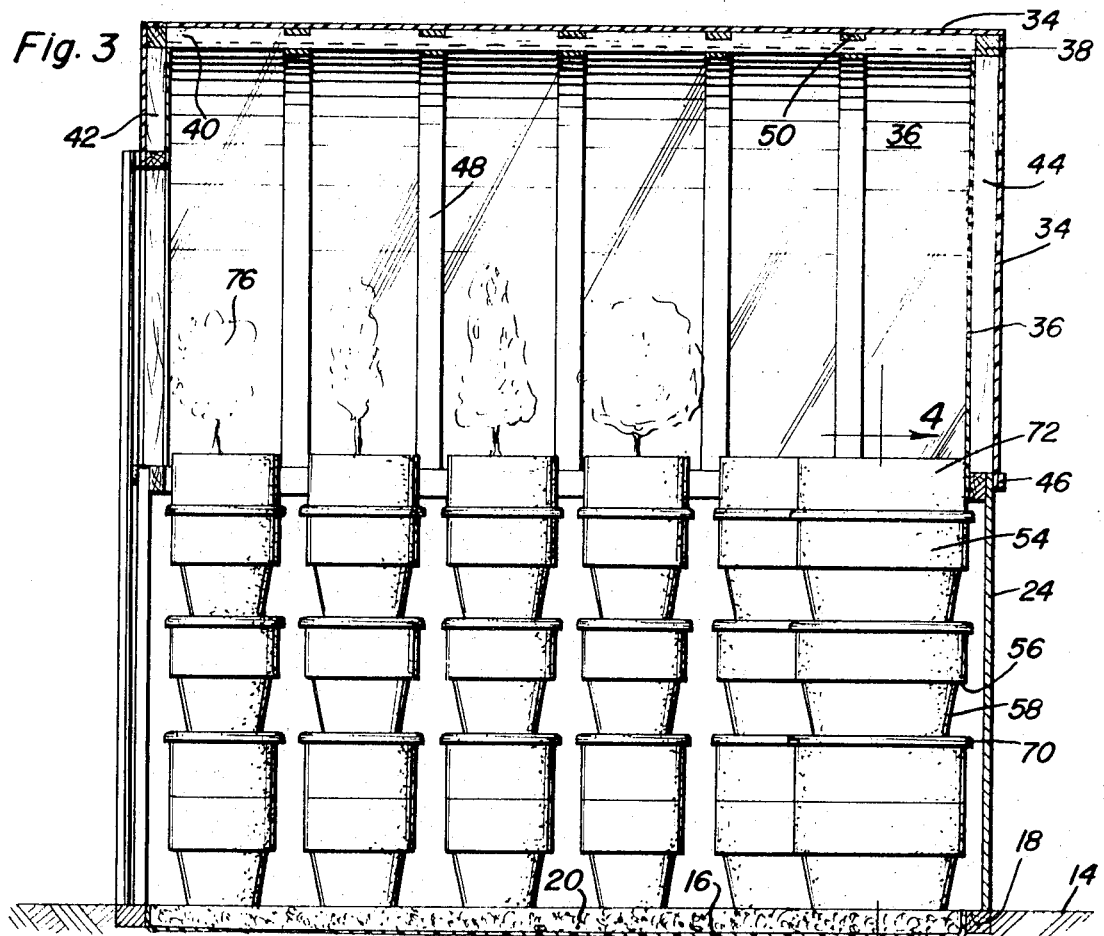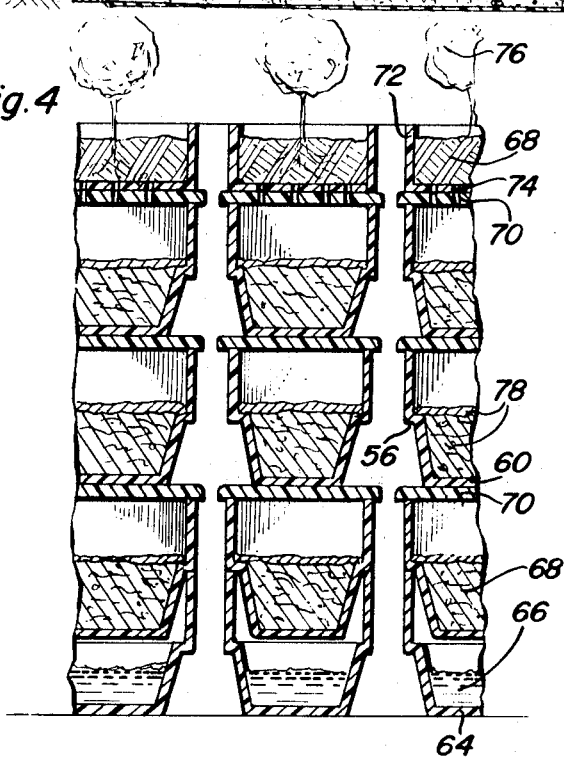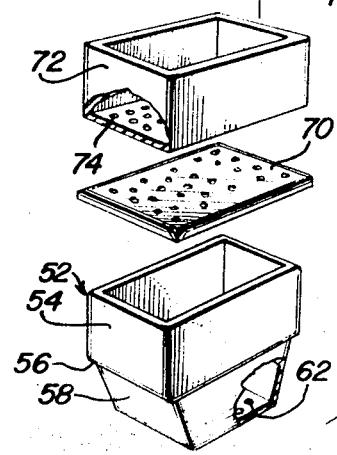

3,654,903

METHOD OF GROWING EARTHWORMS AND PLANTS AND PRODUCING COMPOST

BACKGROUND OF THE INVENTION

1. Field of the Invention

The present invention generally relates to a method of growing earthworms and plants and producing compost as well as an apparatus for practicing the method which may be either stationary or portable in nature.

2. Description of the Prior Art

Previously, earthworms have been provided in containers having a bedding therein which are sold for bait for use by fishermen. An example of this arrangement is found in U.S. Pat. No. 3,499,420, issued Mar. 10, 1970. U.S. Pat. No. 2,867,055, issued Jan. 6, 1959 discloses an earthworm trap and breeding box in the form of a container having a bedding therein of the type which will attract earthworms from the soil into the trap from which the earthworms are removed. Neither of the above patents or any previous prior art employs a method and apparatus providing a habitat for growing earthworms and plants if desired and also producing compost.

SUMMARY OF THE INVENTION

An object of the present invention is to provide a method for growing earthworms and plants and producing compost which includes a structure having a transparent or semi-transparent roof to provide a controlled environment interiorly thereof in which is placed a plurality of leaching and growing columns.

Another object of the invention is to provide a leaching and growing column as set forth in the preceding object incorporating a plurality of stacked boxes with the intermediate and uppermost boxes having perforations in the bottom thereof and the lowermost box having a solid bottom for retaining liquid compost therein with the method involving the pouring of leaching fluid into the uppermost box so that it will pass downwardly through the bedding having earthworms therein in the boxes for leaching compost from all of the boxes and drain it into the lowermost box.

A further object of the invention is to provide a leaching and growing column in accordance with the preceding objects in which the uppermost box is employed to grow plants, seedlings, plant cultures, and the like.

Still another object of the invention is to provide a method and apparatus as set forth in the preceding objects which is simple but yet effective for its purposes and which will grow earthworms and plants and produce compost in a manner which renders the procedure economical.

BRIEF DESCRIPTION OF THE DRAWINGS

FIG. 3 is a longitudinal, vertical sectional view taken substantially upon a plan passing along section line 3—3 of FIG. 2 illustrating further details of the building structure and the leaching and growing columns therein.

FIG. 4 is a vertical sectional view taken substantially upon a plane passing along section line 4—4 of FIG. 3 illustrating further structural details of the leaching and growing columns.

FIG. 5 is an exploded group perspective view, with portions thereof broken away illustrating the uppermost container and one of the intermediate containers.

DESCRIPTION OF THE PREFERRED EMBODIMENT

Figure 1:
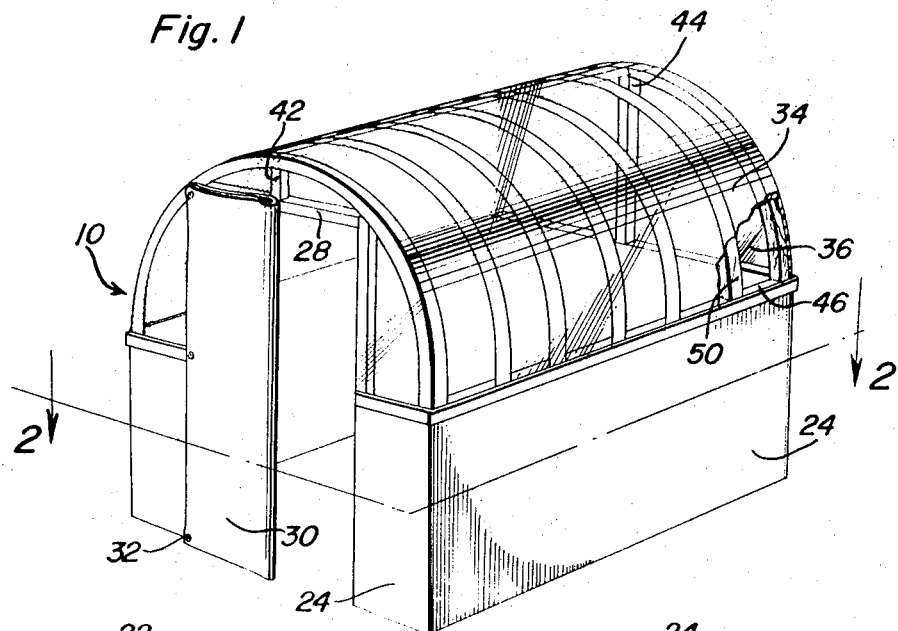
FIG. 1 is a perspective view of the building structure forming a controlled interior environment.

Referring now specifically to the drawings, the numeral 10 generally designates a building structure which may be either stationarily supported or portable or semi-portable in order to enable the building to be moved from place to place as desired. Disposed within the building is a plurality of leaching and growing columns each generally designated by the numeral 12 which are used for growing earthworms and plants and producing compost within the controlled environment or habitat formed by the building 10.

The building 10 may be constructed directly on the ground surface 14 by providing a recess in the ground surface, lining it with waterproof material 16 such as black plastic such as polyethylene or the like and a peripheral frame 18 may be provided for the plastic lining. The plastic lining is filled with gravel 20 or the like such as pea gravel which prevents worms from exiting from the building into the soil and to also prevent loss of moisture into the soil beneath the building. The corners of the building are provided with frame members 22 extending vertically and side panels 24 are attached to the corner frame members 22 with the siding panels 24 preferably being constructed of plywood or other equivalent siding material. Conveniently, the building may be 8 × 8 feet thus enabling the use of 4 × 8 foot panels of plywood. The front end wall of the building is provided with vertical frame members 26 and a horizontal frame member 28 forming the top of a doorway which may be conveniently closed by a flexible panel 30 such as a plastic tarpaulin provided with grommets 32 engaged over double headed nails or other suitable fasteners to enable access to the interior of the building.

The roof of the building is provided by spaced layers of clear polyethylene plastic 34 and 36 which is provided not only around the semi-circular roof but also on each end wall. The semi-circular roof is supported by a plurality of bows 38 at each end of a ridge pole 40 with the bows being also supported by vertical end frame members 42 and 44 which extend centrally from the upper frame member 28 at the front door and from the horizontal frame member 46 around the top of the wall panels 24. The plastic layers 34 and 36 are spaced apart approximately 4 inches thus providing a dead air space which conserves moisture and prevents sudden temperature changes. Placed interiorly of the roof is a plurality of bows 48 which are sprung into position against the top surface of the rail 46 thus enabling them to be moved sideways or lengthwise of the roof to provide for control sunlight through the roof. The outside bows 50 may be permanently attached to the rails 46 on the exterior thereof with the outermost layer 34 engaging the outer bows and the inner layer 36 of plastic material engaging the inner bows 48 thus effectively supporting the bows and providing control of sunlight thereby enabling control of the interior environmental conditions within the building structure.

The building may be constructed without the gravel fill and without the recess thus enabling it to be placed upon a ground surface, preferably provided with a black plastic sheet in underlying relation to the building so that it may be easily relocated or rendered portable if desired.

Figure 2:
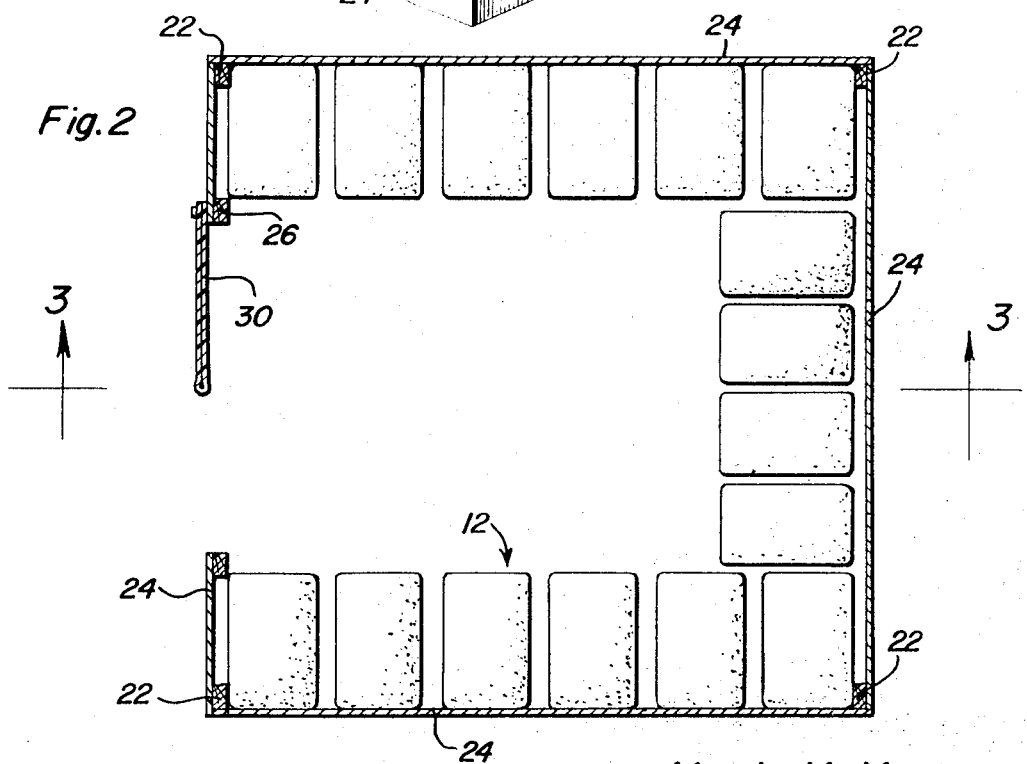
FIG. 2 is a plan, sectional view taken substantially upon a plane passing along section line 2—2 of FIG. 1 illustrating further structural details of the building structure and orientation of the containers or boxes therein.

Each of the leaching and growing columns 12 is disposed within the building in any suitable pattern such as that illustrated in FIG. 2. Each column 12 includes a plurality of vertically stacked containers generally designated by the numeral 52. Each of the containers 52 includes an upper portion 54 generally rectangular in configuration and provided with vertical walls terminating at the bottom edge in a downwardly facing shoulder 56 and extending from the shoulder 56 is a downwardly tapering lower portion 58. The lower portion 58 is formed by inwardly inclined walls terminating in a bottom wall 60 which has randomly spaced apertures 62 therein. The lowermost container in the stack is provided with a solid bottom 64 providing a liquid tight container for receiving and retaining liquid compost 66 therein. Each of the other containers above the bottom container is provided with a quantity of bedding 68 therein. As illustrated, the container 52 immediately above the lowermost container has the lower portion 58 thereof telescoped into the upper portion 54 of the lowermost container with the top edge of the lowermost container supportingly engaging the shoulder 56 on the upper container. The other intermediate containers are supported on a perforated support panel 70 which has a periphery thereof supported on the top edge of the upper portion 54 of an underlying container and which supports the perforated bottom of an overlying container. The uppermost container in the stack is actually a half container in that it includes a rectangular portion 72 having a perforated bottom 74 for receiving bedding in which plants 76 may be grown as illustrated in FIGS. 3 and 4. Each container or section thereof must have sufficient perforations to enable drainage of water for leaching purposes to travel from top to bottom and the holes are irregularly spaced and all of these components are preferably constructed of lightweight plastic material such as foam polystyrene or the like. If desired in certain climatic conditions, an electric heater may be provided for the interior of the building or if necessary to maintain control of the interior conditions, an exhaust fan may be provided for the building.

The leaching and growing column is the functional and producing area of the invention and serves as a growing space for both plants 76 and earthworms 78. It also serves as a leaching column for the production of liquid compost collected in the bottom section, which, in turn, may be returned through the column by pouring into the upper container 72 thus serving as additional leaching material and additional plant food source for growing plants and worms and also as a route locator for earthworms seeking other environments for living.

Regarding the route for migration of earthworms, it is pointed out that earthworms characteristically migrate from one locale to another by either crawling along the surface of the earth or along tracks or through holes provided by rotting vegetation in the earth which ever is the handiest for it to use. Since it is not practical for the earthworm to travel from one column to another in this invention, he seeks to travel along the routes provided for drainage into the bottom container and collects there along with the liquid compost. The earthworm may stay in the liquid compost without harm to him for at least a week and be easily captured by screening the liquid compost when pouring it into another container. Thus, with this invention, it is not necessary to handle the earthworms at all in the process of transferring for additional growth or other reasons. Also, the transformation of organic materials to pure organic soil capable of growing plants by the combined action of leaching, earthworm living needs (food, water and air) and proper farming methods (box rotation) also is an inherent characteristic of the invention and unique to it. Further, portability is also a feature of this leaching and growing column and enhances its value since it may be moved to another location and is easy to handle when practicing the invention.

Essentially, each box of earthworm bedding consists of approximately one cubic foot of well soaked peat moss in which is embedded approximately 1,000 adult earthworms by count or 1 pound by weight. Three of the boxes or containers are stacked on each other and a lower receptacle is provided for the liquid compost to leach into. Daily maintenance and care requires that approximately one quart of water be placed in the top box 72 and allowed to leach through all three boxes which will gather nutrients as it is drained to the lower box. The earthworms are fed daily the equivalent of one large handful of laying mash pellets such as that provided for laying hens. Thus, a daily feeding of the earthworms would include approximately 1 ounce of pellets in each of the boxes in each column which has the earthworms and bedding therein. Occasionally, an additive of homemade compost may be added as additional fee for the worms. This arrangement will result in the collection of approximately one quart of liquid compost per day of a standard quality. The earthworm population, however, will naturally reproduce and become more than would be reasonable to retain in the small space involved. Therefore, after the bedding boxes have become populated with numerous small worms as well as the adult worms, then the adult population should be removed and a new box set up for them to continue the production of liquid compost and small worms. The unit from which the adult worms have been removed now will serve as growing media for the young worms and also for plant culture, should it be so desired. Generally, the liquid compost is intended to be produced only with adult earthworms and in the bedding.

In the arrangement disclosed, the building and columns may comfortably receive 50,000 adult earthworms and they should produce approximately 4 gallons of liquid compost during each 24-hour period and also provide about 20 square feet of planter space for plant culture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of growing earthworms consisting of the steps of providing a controlled environment, placing a plurality of stacked containers having perforations in the bottom of each container, within the environment, placing bedding and nutrients in each container, seeding each container with a plurality of adult earthworms, providing a periodic food supply to the earthworms in each container and leaching compost from the containers by pouring liquid downwardly through the containers at predetermined intervals and in predetermined quantities.

2. The structure as defined in claim 1 wherein the method also includes the step of collecting the leaching liquid and compost entrained therein for providing a liquid compost product.

3. The method as defined in claim 2 including the step of growing plant cultures in the uppermost container.

4. The method as defined in claim 3 together with the step of separating adult earthworms from younger earthworms to provide a supply of adult earthworms, the pouring of a liquid leaching material also providing for migration of earthworms into the liquid compost, and separating the earthworm from the liquid compost by screening the compost as it is poured from the containers.

5. A device for growing earthworms and producing compost comprising a plurality of vertically stacked containers with the lowermost container having an imperforate bottom and the containers stacked thereon having a perforated bottom to enable drainage of compost to the bottom container, a quantity of bedding and earthworms in each of the containers above the bottom container for producing compost and reproducing earthworms whereby liquid leaching material may be poured into the uppermost container and drained to the bottom container.

6. The structure as defined in claim 5 wherein said containers are constructed of lightweight foam plastic material, said containers above the lowest container being supported by a perforated support panel engaging the top edge of the lower container and supporting the perforated bottom of an upper container.

7. The structure as defined in claim 6 wherein the uppermost container is provided with bedding supporting plant growth whereby plants may be produced by the assembly.

8. An apparatus for growing earthworms and plants and producing compost comprising a building structure forming an enclosure for a space, the building structure including a double wall transparent roof assembly, and a plurality of leaching and growing columns disposed within the space with each column including a plurality of containers disposed in stacked relation with the lowermost container having an imperforate bottom and the containers stacked thereon having perforated bottoms, the containers having perforated bottoms including a quantity of bedding and earthworms to enable leaching liquid to be poured downward into the uppermost container and drained through the containers into the lowermost container for leaching compost produced by the earthworms from the containers and collecting it in the lowermost container.

9. The structure as defined in claim 8 wherein the intermediate containers are supported from each other by a perforated panel, and an upper container of substantially one-half the depth of the other containers receiving bedding therein in which plants are grown.

10. The structure as defined in claim 9 wherein said roof assembly includes a pair of plastic sheet material disposed in spaced relation and of generally arcuate construction, and a plurality of bows supporting the inner and outer sheets of plastic material with the innermost bows being shiftable to control the sunlight admitted to the space.

* * * * *